Dec. 25, 1951     J. R. KACHELHOFFER     2,579,584
HAND-HARVESTING TOOL
Filed April 25, 1947

Inventor
JOSEPH R. KACHELHOFFER,
By McMorrow, Berman & Davidson
Attorneys

Patented Dec. 25, 1951

2,579,584

UNITED STATES PATENT OFFICE 2,579,584

HAND-HARVESTING TOOL

Joseph Raymond Kachelhoffer, Joliet, Ill.

Application April 25, 1947, Serial No. 743,881

1 Claim. (Cl. 30—134)

This invention relates to a hand-harvesting tool, and more particularly to such a tool adapted for use in harvesting asparagus or similar crops, in truck gardens, or the like.

A primary object of this invention is the provision of an improved tool, whereby such crops as asparagus, celery, and the like, may be cut and harvested without the necessity of the operator bending or stooping.

An additional object of the invention is the provision of such a device which may be readily operated with one hand, while the operator is in upright position, and which will serve securely to hold the stalk of the article being cut during the cutting operation.

Other objects will in part be obvious and in part be pointed out as the description of the invention proceeds, and disclosed in the accompanying drawings, wherein there is shown a preferred embodiment of this inventive concept.

In the drawings.

Similar reference characters refer to similar parts throughout the several views of the drawings.

Figure 1:
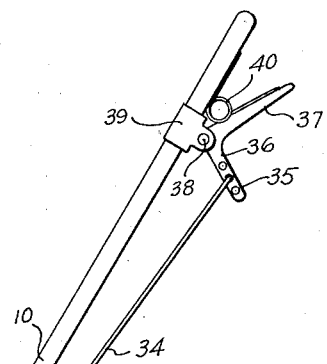
Figure 1 is a side elevational view of one form of device embodying features of the instant invention.
Figure 2:
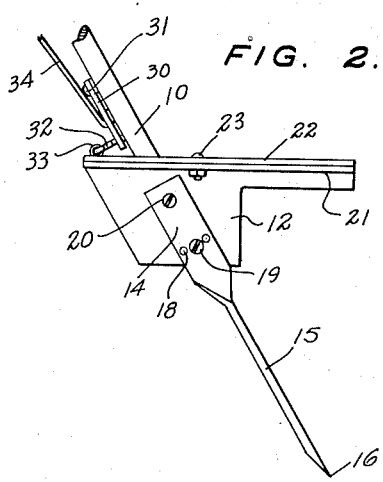
Figure 2 is a fragmentary side elevational view of the device shown in Figure 1, as viewed from the opposite side.
Figure 3:
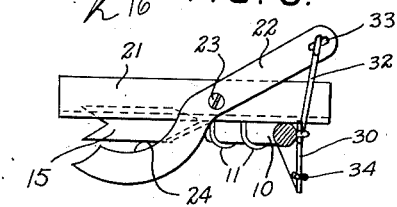
Figure 3 is a sectional view taken substantially along the line 3—3 of Figure 1, as viewed in the direction indicated by the arrows.

Referring to the drawings in detail, there is shown at 10 a rod, secured at its lower extremity, in any desired manner, as by U clamps or bolts 11, to a plate-like member 12, being passed through suitable apertures 13 therein.

The opposite side of plate-like member 12 has secured thereto a portion 14 of a cutting blade 15, provided with a cutting edge 16. The angle of the blade 15 may be varied relative to plate 12, due to the fact that a plurality of arcuately arranged apertures 17 are provided in the plate, and corresponding apertures 18 provided in the hilt 14 of the blade, through any one of which a screw 19 may be passed, a single screw 20 serving to hold the upper portion of the hilt to the plate. Obviously, the relative angle of the blade will be varied with respect to the plate in accordance with which of the apertures 18 is utilized. This cutting blade is employed for cutting produce at either ground level or below such level, with the cutting blade arranged at such an angle that the cutting edge 16 will transversely engage the stem of the vegetable to be harvested, as for example asparagus.

The upper portion of plate 12 is bent at right angles to form a flange 21, which serves as a fixed cutting edge, in conjunction with a cutting jaw 22 arranged in face to face relation therewith, the cutting jaw being pivotally secured to the flange 21, as by means of a pivot 23 for movement into and out of opening and closing engagement with respect to said fixed cutting edge 21. The member 22 is provided with an arcuate cutting edge 24, the arrangement being such that when rotated about the pivot 23 in a manner to be hereinafter more fully described, into conjunction with fixed blade 21, a cutting action will be effected. The fixed cutter 21 and movable cutter 22 are employed for the harvesting of produce in which the stems are to be cut at a point spaced above the ground level.

Figure 5:
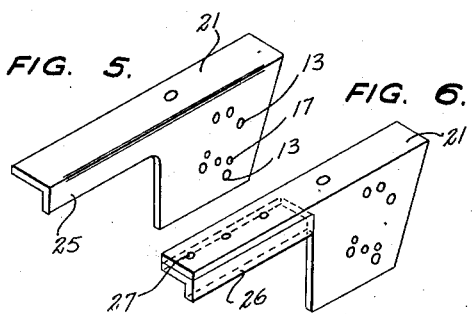
Figure 5 is a perspective view of a constructional detail.
Figure 6:
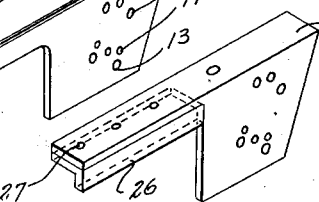
Figure 6 is a perspective view of a modified form of construction.

As best shown in Figure 5, an apron 25 may be provided adjacent the cutting edge 21, in order securely to hold the produce being cut, and the apron may be integral with the plate, or may be separate, as indicated at 26, and secured to portion 21, as by means of rivets or screws 27. It is to be noted that the apron 25 serves as a guide and support for holding the stalks of produce to be cut in position for cutting upon closing movement of the movable cutting member 22.

Figure 4:
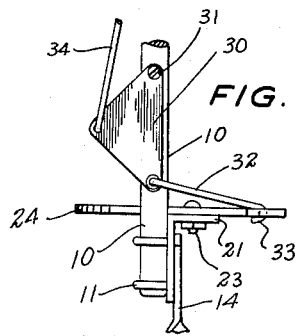
Figure 4 is a rear elevational fragmentary view of the construction shown in Figure 1.

Means are provided for moving the blade 24 about its pivot 23, and take the form, as best shown in Figure 4, of a triangular plate 30 pivotally secured, as by a screw 31, to the handle 10, at one corner thereof. From a second angle of the triangle, a metallic member 32 extends to the extremity of movable member 22, being provided with a hooked end 33 engageable in an aperture therein.

A second movable metallic rod 34 extends from the third angle of the triangular plate 30 upwardly to a point adjacent the top of the handle 10, as best shown in Figure 1, and engages selectively in a suitable one of a series of apertures 35 in one leg 36 of a bell crank-operating handle member, the opposite leg of which is indicated at 37, and which is pivotally secured, as on a pivot 38, to a clamping bracket 39 surrounding said rod adjacent the other end thereof. A spring 40 positioned between said rod and the leg 37 serves normally to bias the handle outwardly and blade 24 to open position. Obviously, upon compression of handle 37 toward handle 10, the blade 24 will be rotated about pivot 23 to effect cutting action in conjunction with the blade 21.

In the use of the device, it will be readily understood that the produce may be positioned between the blade 24 and the blade 21 by suitable manipulation of the rod 10, and that by compression of the handle 37, as previously described, may be readily cut at a desired level. Supplemental cutting blade 16 may be utilized, if necessary or desirable.

From the foregoing it will now be seen that there is herein provided an improved hand-harvesting device, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

A harvesting tool comprising a rod, a vertically disposed plate arranged in side by side relation with respect to said rod adjacent one end of the latter, embracing means on the portion of said rod adjacent said one end and secured to said plate for securing said rod to said plate, a horizontally disposed cutting element positioned on the upper end of said plate and secured thereto, a vertically disposed skirt positioned below and inwardly of one end of said cutting element and fixedly secured to said plate, a cutting jaw positioned in face to face relation with respect to said cutting element and mounted intermediate its ends on said element for movement into and out of closing engagement with respect to the later, and hand actuated means carried by the other end of said rod and operatively connected to said cutting jaw for effecting the movement of the latter.

JOSEPH RAYMOND KACHELHOFFER.

REFERENCES CITED

The following references are of record in the file of this patent:

UNITED STATES PATENTS

| Number | Name | Date |
| --- | --- | --- |
| 546,913 | Botkin | Sept. 24, 1895 |
| 1,151,874 | Harris | Aug. 31, 1915 |
| 1,522,527 | Lynn | Jan. 13, 1925 |
| 1,784,022 | Minikhiem | Dec. 9, 1930 |
| 1,836,293 | Fougstedt et al. | Dec. 8, 1931 |
| 2,314,685 | Brooke | Mar. 23, 1943 |